(12) United States Patent
Lu et al.

(10) Patent No.: US 7,334,900 B2
(45) Date of Patent: Feb. 26, 2008

(54) THREE-DIMENSIONAL IMAGE PROJECTING APPARATUS

(75) Inventors: Chun-Yu Lu, Chu-Nan (TW); Sze-Ke Wang, Chu-Nan (TW)

(73) Assignee: Coretronic Corporation, Miao-Li County (TW)

( * ) Notice: Subject to any disclaimer, the term of this patent is extended or adjusted under 35 U.S.C. 154(b) by 156 days.

(21) Appl. No.: 11/195,529

(22) Filed: Aug. 1, 2005

(65) Prior Publication Data
US 2006/0038964 A1  Feb. 23, 2006

(30) Foreign Application Priority Data
Aug. 20, 2004  (TW) ............... 93125291 A

(51) Int. Cl.
G03B 21/28 (2006.01)
G03B 21/26 (2006.01)
H04N 9/12 (2006.01)
H04N 5/74 (2006.01)
G02F 1/00 (2006.01)
G02B 5/30 (2006.01)
G02B 27/28 (2006.01)
G02B 27/14 (2006.01)

(52) U.S. Cl. .............. 353/84; 353/20; 353/37; 353/99; 348/743; 348/771; 349/9; 359/490; 359/495; 359/497; 359/502; 359/633; 359/634

(58) Field of Classification Search ......... 353/99, 353/20, 30, 31, 37, 98, 84, 102, 119, 122; 348/739, 744, 742, 743, 759, 771; 349/5, 349/7–9; 359/483, 490, 495, 497, 502, 618, 359/629, 633, 634
See application file for complete search history.

(56) References Cited

U.S. PATENT DOCUMENTS 5,921,650 A * 7/1999 Doany et al. ............. 353/31
6,280,034 B1 * 8/2001 Brennesholtz ........... 353/20

FOREIGN PATENT DOCUMENTS

JP  10153755  6/1998

* cited by examiner

Primary Examiner—Rochelle Blackman
(74) Attorney, Agent, or Firm—Birch, Stewart, Kolasch & Birch, LLP

(57) ABSTRACT

The invention provides a three-dimensional image projecting apparatus. The three-dimensional image projecting apparatus comprises a light signal generator, a filter device, a focusing device and a reflecting device. The light signal generator is used for generating a projection light signal. The filter device filters the projection light signal for generating a set of polarized light signal. The focusing device receives the set of polarized light signal for generating a set of focusing light signal. The reflecting device receives the set of focusing light signal for generating a set of reflected light signal.

16 Claims, 4 Drawing Sheets

THREE-DIMENSIONAL IMAGE PROJECTING APPARATUS

BACKGROUND OF THE INVENTION

1. Field of the Invention

This present invention relates to an image projecting apparatus, especially to a three-dimensional image projecting apparatus.

2. Description of the Prior Art

People utilize their two eyes to look at objects, to determine the distance by objects' angles, and to generate three-dimensional perception. Therefore, although both the left and right eye look at the same object, the visual angle of the two eyes are different, thus generating visual angle discrepancy between the two eyes. The visual angle difference between the left and right eye is bigger when the object is closer, and the visual angle difference between the left and right eye is smaller when the object is farther; the visual angle difference between the left and right eye is almost zero when the two eyes look at remote object in parallel.

The theorem of three-dimensional images of the prior art is to simulate the visual angles of the two eyes of humans by using two cameras to shoot simultaneously and then project the images simultaneously by two projectors; one projector simulates the image which is observed by the left eye, and the other projector simulates the image which is observed by the right eye. The images which are simulated by the two projectors are projected onto the same screen by utilizing the synchronization system, and the different images of the left and right eye are separated by utilizing polarization glasses which can filter horizontal and vertical light; therefore, the effect of a three-dimensional image can be shown.

Because the polarization glasses can filter horizontal and vertical light, the glasses which are worn by audience are made from two different polarization glasses, and the two same glasses are set in front of the two projectors; in this way, although the images which are projected by the two projectors look superimposed for the human eyes, the image of the projector with horizontal polarization can only be seen by the one side of the glasses with horizontal polarization, and the image of the projector with vertical polarization can only be seen by the other side of the glasses with vertical polarization. In this way, the different images can be seen by the left and the right eyes to generate the three-dimensional image; this system must use the non-depolarizing screen to achieve these effects.

Because of the low production cost of the polarization glasses, it is suitable to be used in venues for business, such as three-dimensional movie theater. Because the image is projected by utilizing two projectors synchronously, the quality and the luminosity of the image are better; this is the method with the best image quality to watch three-dimensional images by glasses.

However, because in the prior art two projection devices and a synchronization system are used, the cost is higher, and it is not easy to carry; also, because two projection devices must be used, the step of aiming the two projectors, which makes two images of the two projectors project on the same place of the screen, needs to be done before the image is projected, and then the three-dimensional image can be generated correctly.

Therefore, the main objective of the invention is to provide an image projecting apparatus to overcome the above problem.

SUMMARY OF THE INVENTION

An objective of the present invention is to provide an image projecting apparatus. The image projecting apparatus only needs to utilize a single projector to achieve a three-dimensional image projecting effect which must be achieved by two projectors in the prior art.

This invention provides a three-dimensional image projecting apparatus. The three-dimensional image projecting apparatus comprises a light signal generator, a filter device, a focusing device, and a reflecting device. The light signal generator is used for generating a projection light signal. The filter device filters the projection light signal for generating a set of polarized light signals. The focusing device receives the set of polarized light signals for generating a set of focusing light signals. The reflecting device receives the set of focusing light signals for generating a set of reflected light signals.

The three-dimensional image projecting apparatus of the present invention can achieve the three-dimensional image projecting effect by using only a single projecting apparatus, and the step of aiming the projected images of the two image projecting apparatuses can be omitted. The three-dimensional image projecting apparatus of the present invention is not only more convenient but also easier to carry, and it is much cheaper.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
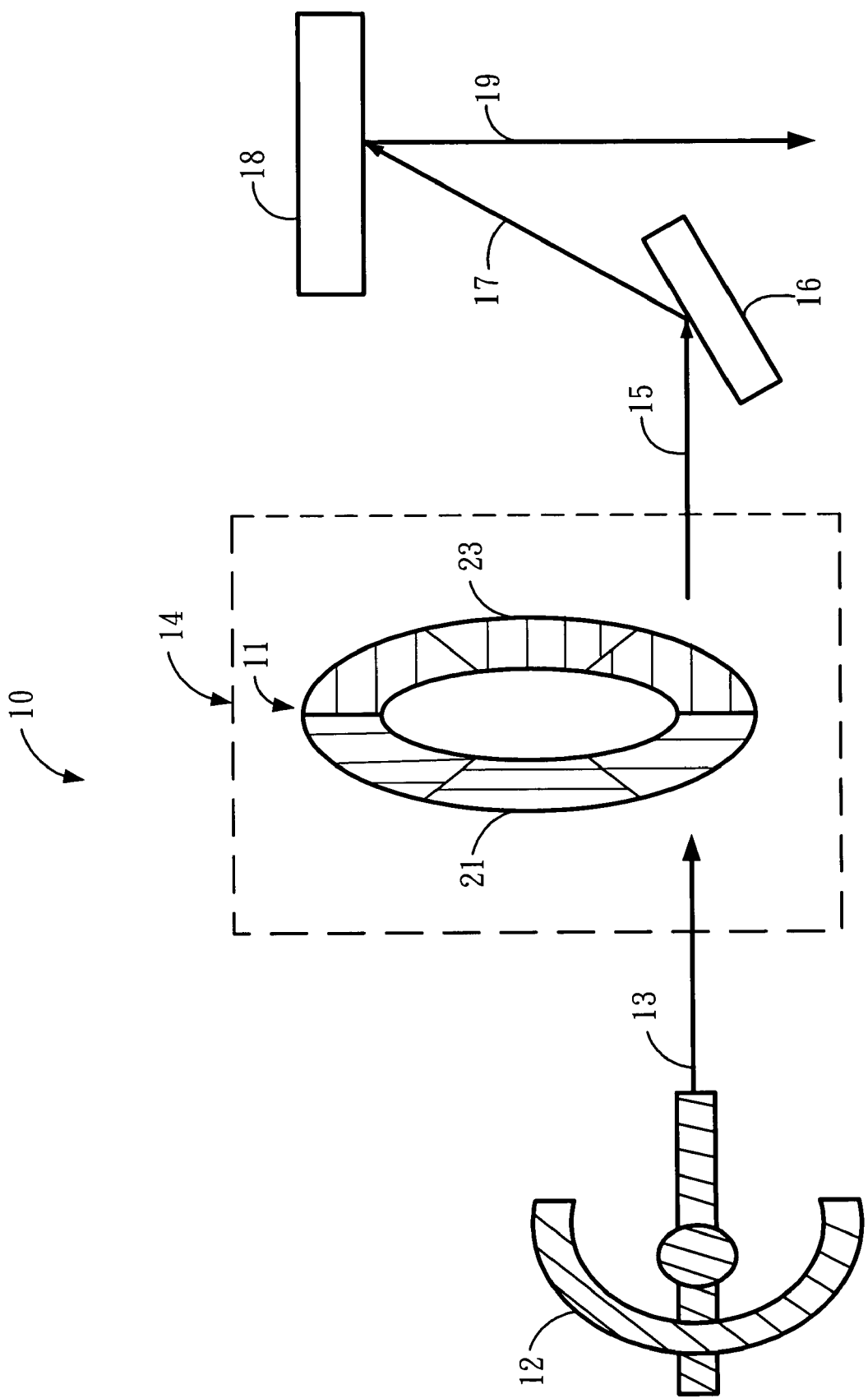
FIG. 1 is a schematic diagram of one embodiment of the three-dimensional image projecting apparatus of the present invention.

Please refer to FIG. 1. The three-dimensional image projecting apparatus 10 of one embodiment the invention comprises a light signal generator 12, a filtering device 14, a focusing device 16, and a reflecting device 18. The light signal generator 12 is used for generating a projection light signal 13. The filtering device 14 filters the projection light signal 13 for generating a set of polarized light signals 15; the polarized light signals 15 comprise a first polarized light signal and a second polarized light signal. The focusing device 16 receives the set of polarized light signals 15 for generating a set of focusing light signals 17. In an embodiment, the focusing device 16 can be a focusing lens. The reflecting device 18 receives the set of focusing light signals 17 for generating a set of reflected light signals 19. The reflecting device 18 is a signal reflective light valve and comprises, for example, a base, a plurality of digital micromirror devices (DMD), and a controller. For the clarification, the reflecting device 18 is referred to as the signal reflective light valve 18 in the following description. The plurality of digital micromirror devices adheres to the base. The controller is used for adjusting the plurality of digital micromirror devices, so that the digital micromirror device processes the set of focusing light signals 17 and produces the set of reflected light signals 19. The reflected light signals 19 comprise a first reflected light signal and a second reflected light signal. The first polarized light signal is projected to the signal reflective light valve 18, and a first reflected light signal is produced; the second polarized light signal is projected to the signal reflective light valve 18, and a second reflected light signal is produced; the first reflected light signal and the second reflected light signal produce different images respectively.

Figure 2:
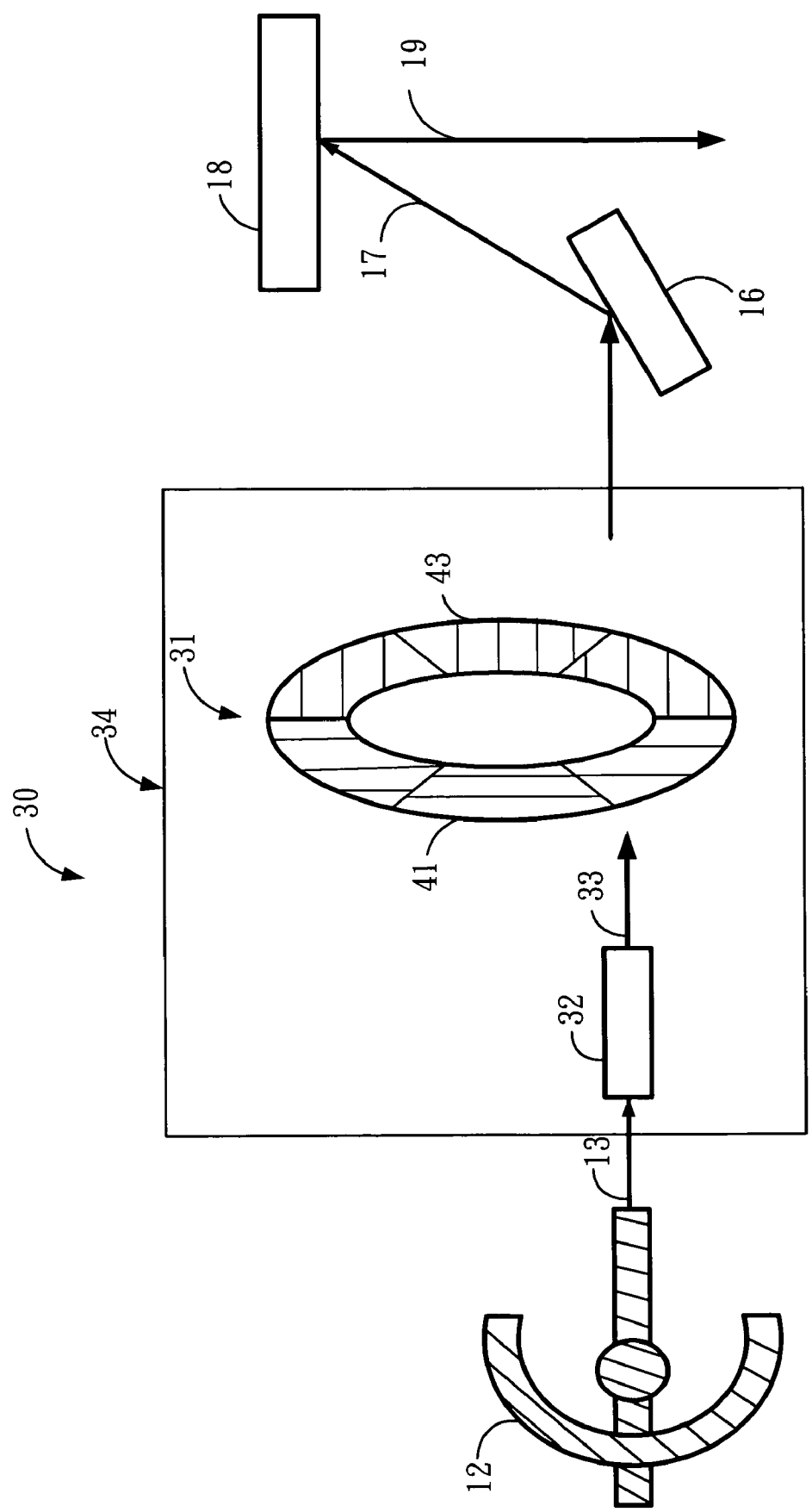
FIG. 2 is a schematic diagram of another embodiment of the filtering device of the image projecting apparatus of the present invention.

In this embodiment, the filtering device 14 device comprises a plurality of color filter 11 for filtering the projection light signal 13 and generating the set of polarized light signals 15. The set of polarized light signals 15 comprise the first polarized light signal and the second polarized light signal. The plurality sets of color filter 11 comprise a first set of color filter 21 and a second set of color filter 23 for filtering the projection light signal 13 and for correspondingly generating the first polarized light signal and the second polarized light signal, respectively; the first set of color filter 21 is P polarization coating, and the second set of color filter 23 is S polarization coating. In the embodiment, the first polarized light signal and the second polarized light signal, which are the P polarized light signal and the S polarized light signal respectively. Utilizing the P polarized light signal and the S polarized light signal and cooperating with the signal processing of the signal reflective light valve 18 make the P polarized light signal and S polarized light signal have different signals. In this way, different images of the left and right eye can be simulated; furthermore, the 3D image can be simulated by using polarization glasses Please refer to FIG. 2. Other different embodiments can further be used to generate the set of polarized light signals 15. As shown in FIG. 2, in another embodiment, the filtering device 34 comprises a converter 32 and plurality sets of color filter 31. The converter 32 receives the projection light signal 13 for generating a transformed light signal 33; the converter 32 can be a P-S converter to transfer the projection light signal 13 to the transformed light signal 33 with single polarity. The plurality sets of color filter 31 are used for filtering the transformed light signal 33 to produce the first polarized light signal and the second polarized light signal. In the embodiment, the second set of color filter 43 is a half-wavelength plate, and the half-wavelength plate can make the polarized light generate a 90 degree phase difference. Therefore, the second polarized light, which has a 90 degree phase difference from the first polarized light, can be generated by the half-wavelength plate.

Figure 3:
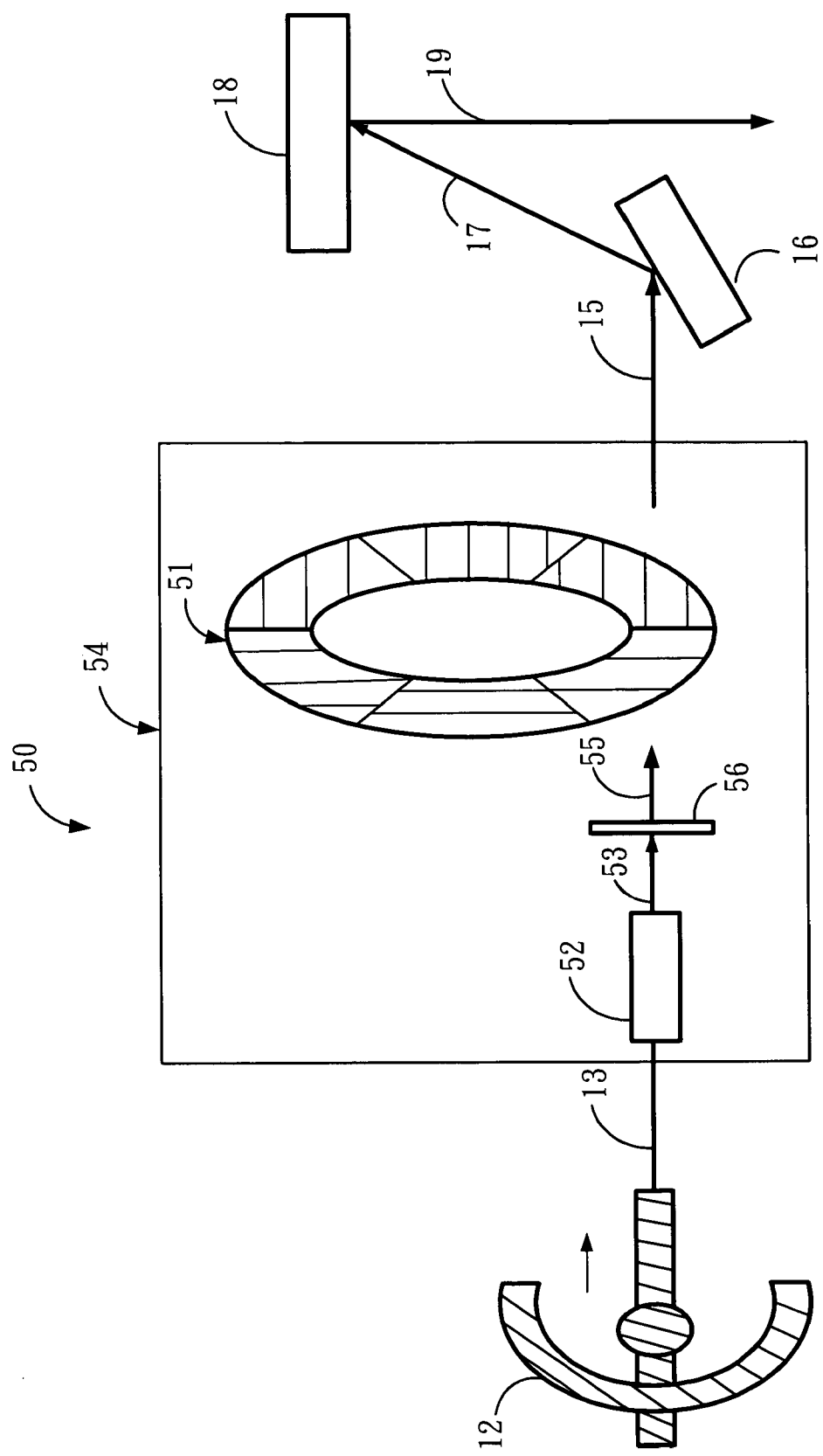
FIG. 3 is a schematic diagram of still another embodiment of the filtering device of the image projecting apparatus of the present invention.

Please refer to FIG. 3. In this embodiment, the filtering device 54 comprises a converter 52, a regulator 56, and plurality sets of color filter 51. The converter 52 is used for transforming the projection light signal 13 to generate a transformed light signal 53; the converter 52 can be a P-S converter to transfer the projection light signal 13 to the transformed light signal 53 with single polarity. The regulator 56 selectivity processes the transformed light signal 53 to produce a regulated light signal 55. The plurality sets of color filter 51 are used for filtering the regulated light signal 55 to produce the set of polarized light signal 15. In this embodiment, the regulator 56 is a half-wavelength plate. The regulator 56 can change the polarity of the projection light signal 13 selectivity to transfer the P polarized light to the S polarized light or to transfer the S polarized light to the P polarized light for generating a regulated signal 55.

Figure 4:
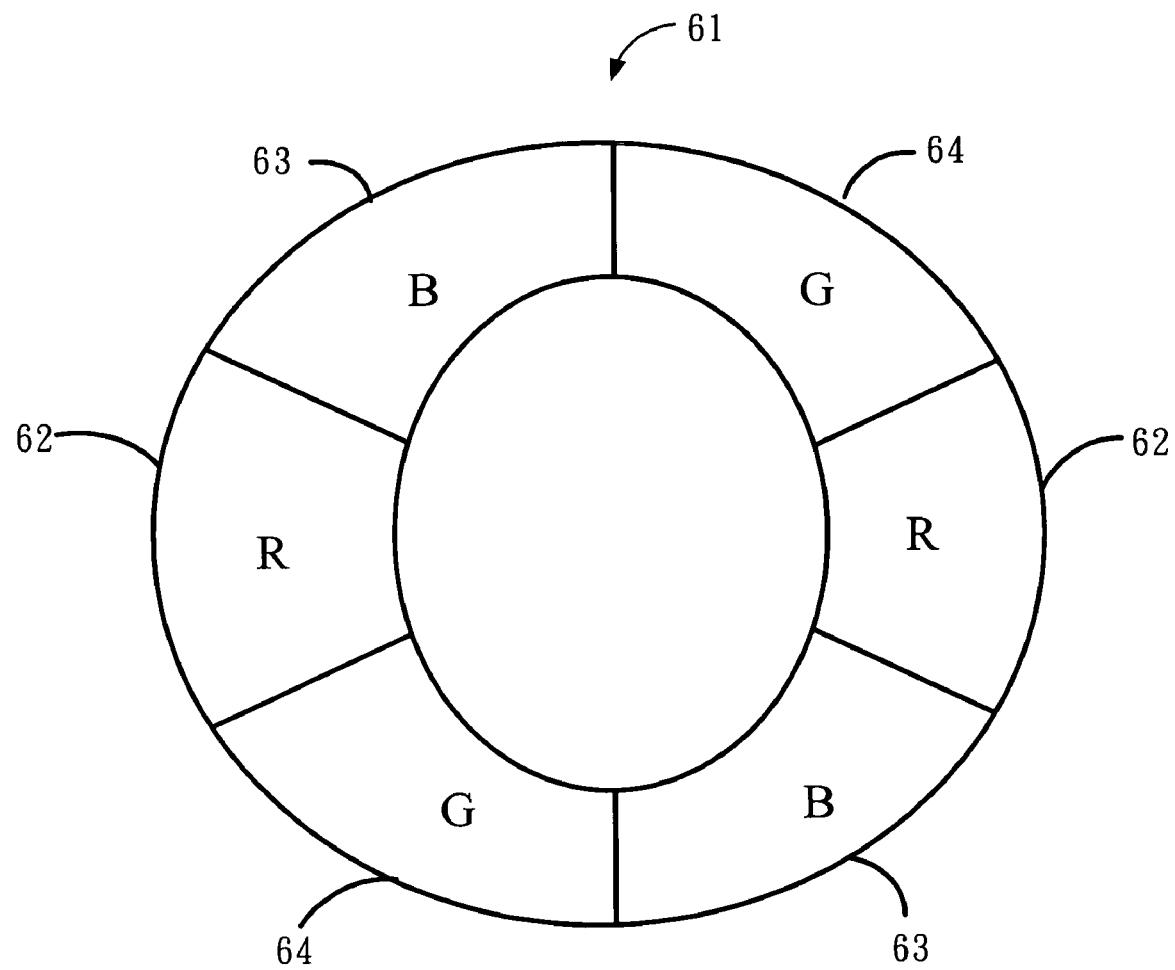
FIG. 4 is a schematic diagram of the color filter of the image projecting apparatus of the present invention.

Please refer to FIG. 4. In each of the above different embodiments, each set of the plurality of color filter 61 comprises a red filter 62, a blue filter 63, and a green filter 64 for filtering the projection light signal 13 and generating the polarized light signal 15 with the first polarized light signal and the second polarized light signal correspondingly.

The three-dimensional image projecting apparatus of the invention utilizes the filtering device to filter the projection light signal and to generate the set of polarized light signals with the first polarized light signal and the second polarized light signal respectively. In this way, it can achieve the three-dimensional image projecting effect by using only a single projecting apparatus, and the step of aiming the projected images of the two image projecting apparatuses can be omitted. The three-dimensional image projecting apparatus of the invention is not only more convenient but also easier to carry, and it is much cheaper.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A three-dimensional image projecting apparatus, comprising:
   a light signal generator for generating a projection light signal;
   a filtering device for filtering the projection light signal to produce a set of polarized light signals;
   a focusing device for receiving the set of polarized light signals to produce a set of focused light signals having the set of polarized light signals with different polarization; and
   a signal reflective light valve for receiving and reflecting the set of focused light signals having polarized light signals with different polarization to produce a set of reflected light signals, wherein the polarizations of reflected light signals are the same as the polarizations of the focused light signals.

2. The three-dimensional image projecting apparatus of claim 1, wherein the signal reflective light valve comprises:
   a base;
   a plurality of digital micromirror devices (DMD) adhered to the base; and
   a controller for adjusting the plurality of digital micromirror devices, the digital micromirror device processing the set of focused light signals and producing the set of reflected light signals.

3. The three-dimensional image projecting apparatus of claim 1, wherein the set of polarized light signals comprises a first polarized light signal and a second polarized light signal, and the set of reflected light signals comprises a first reflected light signal and a second reflected light signal, the signal reflective light valve reflecting the first polarized light signal and the second polarized light signal to generate the first reflected light signal and the second reflected light signal respectively, the first reflected light signal and the second reflected light signal generating different images respectively.

4. The three-dimensional image projecting apparatus of claim 3, wherein the polarization of the first polarized light signal is perpendicular to the polarization of the second polarized light signal.

5. The three-dimensional image projecting apparatus of claim 3, wherein the filtering device comprises a plurality of color filters for filtering the projection light signal to produce the first polarized light signal and the second polarized light signal.

6. The three-dimensional image projecting apparatus of claim 5, wherein the plurality of color filters comprise a first set of color filters and a second set of color filters, the first set of color filters includes a P-polarization coating, and the second set of color filters includes a S-polarization coating.

7. The three-dimensional image projecting apparatus of claim 5, wherein each set of the plurality of color filters comprises a red filter, a blue filter and a green filter.

8. The three-dimensional image projecting apparatus of claim 3, wherein the filtering device comprises:
   a converter for receiving the projection light signal to produce a transformed light signal; and
   a plurality set of color filters for filtering the transformed light signal to produce the first polarized light signal and the second polarized light signal.

9. The three-dimensional image projecting apparatus of claim 8, wherein the converter is a P-S converter for transforming the projection light signal to the transformed light signal with single polarization.

10. The three-dimensional image projecting apparatus of claim 8, wherein the plurality set of color filters comprise a first set of color filters and a second set of color filters, and the second set of color filters is a half-wavelength plate.

11. The three-dimensional image projecting apparatus of claim 10, wherein each set of the plurality of color filters comprises a red filter, a blue filter and a green filter.

12. The three-dimensional image projecting apparatus of claim 3, wherein the filtering device comprises:
   a converter for transforming the projection light signal to a transformed light signal;
   a regulator for selectively processing the transformed light signal to produce a regulated signal; and
   a plurality set of color filters for filtering the regulated signal to produce the set of polarized light signals.

13. The three-dimensional image projecting apparatus of claim 12, wherein the converter is a P-S converter for transforming the projection light signal to the transformed light signal with single polarization.

14. The three-dimensional image projecting apparatus of claim 12, wherein the regulator is a half-wavelength plate.

15. The three-dimensional image projecting apparatus of claim 12, wherein each set of the plurality of color filters comprises a red filter, a blue filter, and a green filter.

16. The three-dimensional image projecting apparatus of claim 1, wherein the focusing device is a focusing mirror.

* * * * *